Figure 1:
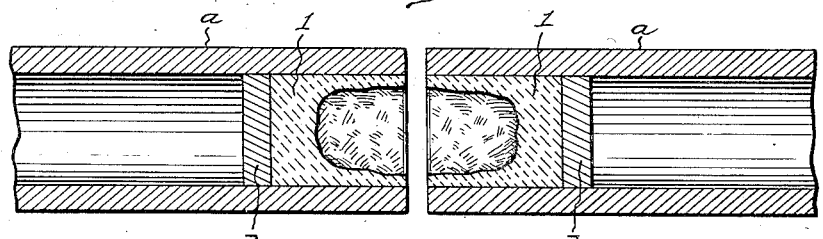

Aug. 28, 1934.  W. C. CORYELL  1,971,369
ART OF WELDING
Filed Dec. 26, 1931

INVENTOR
William C. Coryell.
BY
ATTORNEYS

WITNESS

Patented Aug. 28, 1934

1,971,369

UNITED STATES PATENT OFFICE 1,971,369

ART OF WELDING

William C. Coryell, Youngstown, Ohio

Application December 26, 1931, Serial No. 583,302

11 Claims. (Cl. 219—10)

During the operation of joining two articles by welding, particularly where their adjacent surfaces are brought together in abutting relation and a heavy electric current caused to traverse from one to the other as in the ordinary electric butt welding method so as to fuse the metal in the vicinity of the joint, a considerable quantity of the metal is expelled from the weld in pellets or globules, generally known as "flashings", which term for convenience will be employed herein. These flashings are forcibly thrown out from the weld in different directions and tend to collect on the surfaces of the articles adjacent the welding point if the said surfaces are in a position suitable for receiving them and to then adhere thereto, sinter, and become extremely hard, so that if it is necessary to remove them after the completion of the weld, a considerable amount of time and labor is required while, because of the extreme hardness of the sintered flashings, the tools employed are rapidly dulled or otherwise rendered unserviceable. While the removal of the flashings from an outer surface to which access can readily be had is thus frequently an annoying and somewhat expensive job, the difficulties presented are greatly enhanced when the flashings have to be removed from the interior of a tubular article as, for example, from two sections of pipe which have been welded together, or from a tubular casing or container one end of which has been closed by welding-on a generally cup-shaped bottom or cap. Indeed, the removal of the flashings through the open end of a container of this character is frequently well-nigh impossible for the reason that when the end is welded in place a ridge is formed in the interior of the container in the vicinity of the weld which projects circumferentially inward into the bore with corresponding local restriction of the latter, while the flashings often tend to accumulate between this ridge and the solid end of the container in a disc-like formation of greater diameter than the opening bounded by the ridge, so that it is impossible to pull the agglomerated mass of flashings therethrough without first laboriously chipping or otherwise reducing the mass to fragments of a size which can pass through the opening defined by the ridge.

The present invention, therefore, is primarily directed to a method of minimizing the difficulties to which reference has just been made by facilitating the removal of the flashings not only from the interiors of hollow welded articles but, in fact, from any surface adjacent a welded area upon which tend to collect the drops or globules of metal thrown out from the weld during its formation.

Other objects and novel features comprehended by the invention, as well as advantages incident to or arising from its use in welding operations, are hereinafter particularly mentioned or will be apparent as the nature of the invention is more fully explained.

Moreover, while the invention may desirably be employed in connection with many different methods of welding, it is of particular advantage in connection with electric butt welding of articles presenting surfaces adjacent the welding point upon which the metal expelled from the weld during its formation tends to collect and from which it is thereafter required to be removed. I shall therefore herein refer more especially to the practice of the invention in connection with welding of this character, not, however, with any thought or intention of confining the use of the invention thereto, but merely to facilitate comprehension of the invention by those skilled in the art and thereby enable them to apply it in any kind of welding in which it may be advantageously utilized.

Figure 2:
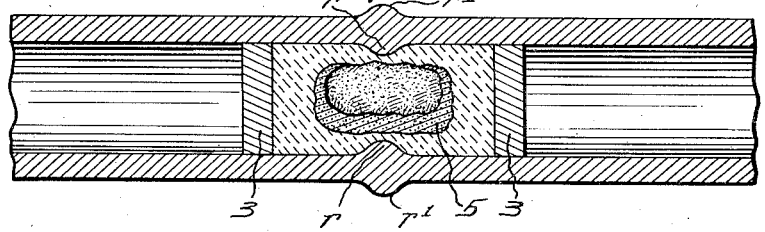
Figure 3:
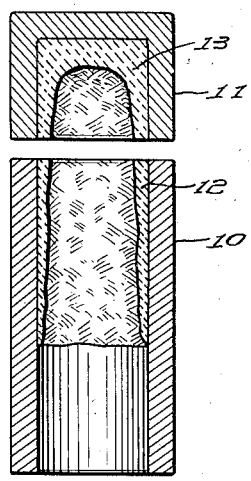
Figure 4:
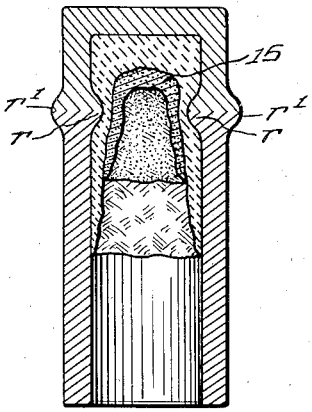
Figure 5:
Figure 6:
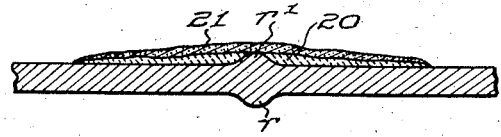

While the specific application of the principles of the invention will naturally vary somewhat in accordance with the particular kind and form of articles being welded and/or the particular welding method to be employed, they will nevertheless be readily understood from the following description of certain applications thereof, in connection with which reference will be had to the accompanying drawing in which I have shown, somewhat diagrammatically, certain articles as they appear when prepared for welding in accordance with the present invention and also after the welding operation has been performed. Thus, Fig. 1 is a longitudinal central section of the juxtaposed ends of two pipes which are to be joined by electric butt welding and which have been properly prepared therefor, while Fig. 2 is a similar view of the parts after the completion of the weld. Fig. 3 is a similar section of a properly prepared tubular shell and generally cup-shaped end or base therefor just prior to the parts being brought together at the commencement of the welding operation, while Fig. 4 shows the parts after completion of the weld. Fig. 5 is a vertical section through two flat plates properly prepared for welding with their ends in juxtaposed relation preparatory to their being brought together, while Fig. 6 shows the parts after completion of the weld. Like characters of reference designate corresponding parts throughout the drawing.

Broadly considered, my invention comprehends application to the surfaces of the parts which are to be welded and prior to the commencement of the actual welding operation of a protective coating or layer of some material, preferably of such character as to have no effect on the parts themselves or on the formation of the weld, which is adapted to receive and to some extent retain the flashings discharged from the weld during its formation and so prevent them from coming into contact with or adhering to the metallic surfaces in its vicinity, yet capable of being readily broken up after the weld is completed and removed with the entrained flashings, thus leaving the surfaces which it protected during the welding operation substantially free from adhering bodies of metal.

Any material suitable for the purpose may be utilized to form the protective coating, although I prefer to use some inert substance such as clay, lime, asbestos, molding sand, core material, or the like, and it may be applied either wet or dry. Under certain conditions where only a thin coating is required, the coating may take the form of a paint or wash, compositions generally similar to those used in the interior of ingot molds preparatory to casting ingots therein being frequently suitable for the purpose, but in other and more usual cases, the coating is applied in more or less plastic form, it being, of course, desirable that the coating material be of such character as to adhere to the surface to which it is applied with sufficient tenacity to insure its remaining in place.

Under most conditions, plastic compositions of clay or the like give good results and, when two tubular pieces such as the pipe sections $a$—$a$, are to be butt welded, the composition may be applied to the interiors of the pipe ends before the latter are brought together so as to form hollow cup-shaped plugs 1, 1 therein, the cavities in the plugs approximating in length, measured back from the extremities of the sections, a distance preferably equal to that to which the bulk of the flashings are ordinarily thrown during the welding operation. To back up and support the coating material, some suitable means may be disposed behind it in each pipe section such as a circular disc 3 of wood or refractory material, or a disc of sheet metal having a peripheral flange adapted to rest against the pipe wall, but whatever be the specific means employed, it should be of such character that it can be readily drawn out of or otherwise removed from the outer end of the pipe section after the completion of the weld and preparatory to the removal of the protective material and accumulated flashings.

The pipe ends, having been prepared in the manner described, are then brought into abutting relation in the welding machine pursuant to ordinary butt welding procedure and the weld made by the application of the current in the customary way. During the formation of the weld, the coating material in proximity to the plane of the weld is displaced and to some extent burned off as the usual inner ridge $r$ and corresponding outer ridge $r^1$ are respectively produced, but otherwise remains intact or substantially so and thus operative to receive the flashings thrown off inside the pipes while the weld is being made, so that at the conclusion of the latter, the parts present somewhat the appearance indicated in Fig. 2, the flashings being collected in an agglomerated mass 5 on or adjacent the inner surface of the coating. When the pipes are welded with their axes horizontal, the agglomerated mass of flashings is generally thickest at the lower side of the joint and thinner toward the upper side thereof due to the natural tendency of the flashings to fall after they are emitted, susbtantially as indicated in Fig. 2.

As soon as the weld is cold, the backing-up plugs 3 can be removed from the outer ends of the welded section preparatory to removal of the coating material and flashings accumulated thereon and intermixed therewith, thus leaving the interior of the pipe adjacent the joint in susbtantially as clean and perfect condition as it was prior to the making of the weld. Frequently, all that is necessary to remove the more or less adherent mass of coating material and flashings is to stand the welded pipe on end and jar it a little, but sometimes it may be necessary to introduce first a bar or the like to loosen the mass from the pipe wall and break it up into fragments which can be easily scraped or shaken out.

Reference has already been made to the advantages accruing from the use of my invention in welding ends on tubular shells and the like, and such an application thereof is shown in Figs. 3 and 4. Preferably, the shell 10 to which is to be joined a generally cup-shaped base or end 11 is disposed in a vertical position for the welding operation and the end 11 supported in inverted position thereover and moved vertically downward to meet the shell in forming the weld, since by maintaining the parts in this position a large part of the flashings as they are thrown off drop to the bottom of the shell or rather to the supporting surface on which it rests, thus minimizing the amount of flashing material received by the protective coating.

When preparing articles of this character for welding, a protective coating or lining 12 is disposed about the interior of the upper end of the shell and carried down therein for a sufficient distance to prevent contact of any material amount of the flashings therewith, but of course no backing-up disc 3 or the like is provided since it is desired to leave the bore of the shell open as far as possible to permit the bulk of the flashings to fall therethrough as already described. Within the part 11 is also disposed a plug or lining of the protective material 13 which is preferably carried over the entire inner surface of the part as shown. It may be noted at this point that the maximum diameter of the cavity in this plug or lining should be less than the diameter of the opening in the inner ridge $r$ which will be subsequently formed at the weld so as to insure that the diameter of any agglomerate of flashing material which may be formed above this ridge will not exceed the diameter of the opening through which it must pass when it is extracted, for it often happens that the flashing material tends to form initially as a ring in the interior of the part 11 which, as the welding operation continues, gradually builds up inwardly so as to eventually create an annulus or a disc, obviously, if the diameter of this formation is greater than the effective area of the opening bounded by the ridge $r$, it would be extremely difficult to extract it from the welded article. However, by employing sufficient covering or lining material within the part 11 to reduce the maximum diameter of the cavity therein to less than the inside diameter of the subsequently formed ridge $r$, the agglomerate can readily be extracted through the latter whenever be its shape or conformation.

When the parts 10 and 11 are brought together and welded, the circumferential ridges $r$, $r^1$ are thrown up in the ordinary way, while such of the flashings as do not fall to the bottom of the shell are caught by the lining material therein or in the end 11 and adhere thereto as already described, so that after the weld is cold, the article can be laid on its side and the lining material and agglomerated flashings 15 readily extracted through its open end or else merely shaken out by suitably jarring the article when in inverted position.

The present invention greatly facilitates the production of containers or other articles of the general character of that shown in Fig. 4 embodying a shell 10 having its grain structure running in one direction and a base or end 11 having its grain structure running in another. Heretofore, most heavy closed end containers have been formed by a drawing operation but have been considered objectionable for certain purposes because of the possibility of weakness or hidden defects in the base or end due to the fact that the latter, in a seamless drawn container, is formed of metal which was disposed about the axis of the ingot from which the container is drawn and which may have thus contained a cavity which was not fully closed and welded during the rolling of the ingot. This objection can be readily overcome through the medium of my invention since through its use a container having a tube or shell which has been rolled in a direction parallel to its axis and a base or end which has been rolled in a direction at right angles thereto can readily be constructed with resulting production of an article whose end or base is as free from defects as its side walls. Heretofore, however, it has been substantially impossible to manufacture such welded containers at reasonable cost because of the difficulty of removing the flashings from the interiors of the containers in the vicinity of the welded joint, so that relatively expensive forged steel containers have been customarily employed where it was felt that the seamless drawn containers were unsuitable because of the liability of defective ends.

While it will of course be appreciated that these containers or generally similar tubular articles may be welded in a horizontal position after suitable preparation of the parts in accordance with my invention, more satisfactory results are attained when the parts are welded in vertical position as above explained for the reason that there is then no greater tendency for the flashings to collect at one point than at another on the protective coating while the total amount which accumulates thereon is materially reduced, so that the operation of extracting the agglomerated flashings and coating material after completion of the weld is greatly facilitated with consequent lowering of production costs.

It will be apparent from the foregoing that my invention can be also readily employed to advantage when butt welding flat plate or the like, such as are shown in Fig. 5, by applying a protective coating 20 to the upper surfaces of the plates in the vicinity of the weld prior to making the latter, this coating serving to protect the said surfaces from the flashings initially thrown upwardly from the weld and which, of course, tend to fall back by gravity and accumulate upon and adhere to the plates, from which, under certain conditions, they must subsequently be removed. After the weld is cold, the flashing material 21 as well as the coating can be readily scraped off with much less labor and in a much shorter time than is required to remove the flashings from the plates themselves as has heretofore been necessary.

I have found that, irrespective of the nature of the particular articles being welded, it is desirable when welding steels containing the higher carbons to apply the coating material dry or to apply it in plastic condition and allow it to dry before making the weld so as to prevent a quenching effect on the heated steel in the vicinity of the weld through the presence of appreciable amounts of moisture in the coating material.

As a result of the practice of the present invention, the surfaces of the metal in the vicinity of the weld which have been suitably protected by the coating are left substantially free from adhering globules or pellets of metal so that the necessity of cleaning up the work by the laborious methods heretofore employed is avoided and the operation of smoothing off the ridge $r$ facilitated in cases in which it is desired to form a smooth joint flush with the adjacent surfaces, while the use of an internal backing-up ring or the like on the inside of the joint, which is sometimes utilized to prevent entrance of the flashing material to the interior of the hollow article, and which of course must necessarily be left in position after the welding operation since the ring becomes fused with the weld itself, is entirely obviated.

I have herein referred more especially to the practice of my invention as applied in connection with the butt welding of certain classes of articles to which it is particularly applicable, but it will be understood, as heretofore pointed out, that the principles of the invention may be utilized with equal advantage and facility in other kinds of welding and/or with other classes of articles and that the specific details of application of the said principles may be suitably modified to adapt the invention to any particular operating conditions without departing from the spirit and scope of the invention as defined in the appended claims.

Having thus described my invention, I claim and desire to protect by Letters Patent of the United States:

1. In the art of electrically butt welding tubular articles, that improvement which consists in lining the inner surfaces of the articles to be welded and prior to making the weld with an adherent coating of material adapted to receive the flashings expelled during the making of the weld and prevent contact thereof with said surfaces then welding the articles and thereafter breaking up the coating and removing the flashing therewith.

2. In the art of butt welding tubular articles, that improvement which consists in applying to the interiors of the articles adjacent the ends thereof which are to be welded, a coating adapted to receive the flashings inwardly expelled while the weld is being made and protect the interior surface of the articles therefrom, and then forming the weld with said coatings in the articles.

3. In the art of butt welding tubular articles, that improvement which consists in disposing in the interior of each article adjacent the end thereof which is to be welded, a body of inert material of such shape as to entirely cover the interior of the article for a substantial distance from its said end and to then extend entirely across its bore, and then making the weld with said coatings in the articles.

4. In the art of butt welding tubular articles, that improvement which consists in applying to the interior of each article adjacent the end thereof which is to be welded, a body of inert material of such form as to entirely cover the interior of the article for a substantial distance from its said end and to then extend entirely across its bore, reinforcing said body at the extremity thereof remote from the end of the article, and then making the weld with said material and said reinforcing means in the articles.

5. The method of butt welding tubular articles which comprises the steps of coating the interiors of the articles adjacent the ends which are to be welded with a material inert to the articles and to the formation of the weld and adapted to prevent contact with the articles of metal expelled inwardly from the weld while it is being formed, disposing the articles with their axes in vertical position, bringing the juxtaposed end of the articles together and forming a welded joint therebetween, and then removing from an outer end of the welded article the agglomerated mass of said material and said metal.

6. The method of making a butt welded joint between the ends of two tubular articles which comprises the steps of first coating the interior of each article adjacent the end to be welded with plastic material adapted to receive the flashings inwardly thrown off from the weld during its process of formation and protect the interior surface of the article therefrom, disposing the coated articles with their axes aligned in vertical position, then bringing the juxtaposed ends of the articles together and forming a weld therebetween, and finally removing from the interior of the welded article the residue of said coating and the flashings carried thereby.

7. The method of butt welding a base or the like on a hollow shell so as to form a container closed at one end and open at the other, which comprises the steps of lining the shell adjacent the end which is to be welded with an inert material, similarly lining the interior of the base in such manner as to form therein a cup-shaped mass of the lining material, the maximum diameter of the cavity within said mass being less than the internal diameter of the inner ridge which is subsequently formed at the weld, disposing the shell in vertical position, bringing the base into juxtaposed relation with the upper end of the shell, forming the weld between the parts, and then removing from the open end of the welded container the residual agglomerate of lining material and flashings inwardly expelled from the weld while it is being made.

8. The method of butt welding a cup-shaped base or the like on a hollow shell so as to form a container closed at one end and open at the other, which comprises the steps of lining the shell adjacent the end which is to be welded with clay, similarly lining the interior of the base in such manner as to form therein a cup-shaped mass of the lining material, the maximum diameter of the cavity within said mass being less than the internal diameter of the inner ridge which is subsequently formed at the weld, disposing the shell in vertical position, bringing the base into juxtaposed relation with the upper end of the shell, moving the parts together and forming the weld therebetween, and finally removing from the open end of the welded container the residual lining material and the metallic flashings which were inwardly expelled from the weld during its process of formation and agglomerated with said material.

9. In a method of butt welding together the ends of two tubular articles, the steps of lining the end of each article prior to forming the weld with material adapted to protect the inner surface of the article from contact by flashings thrown off during the formation of the weld, bringing said ends of the articles together and forming a weld therebetween, and finally removing from the welded articles the agglomerated mass of lining material and metallic flashings remaining therein after the completion of the weld.

10. In a method of butt welding together the ends of two tubular articles, the steps of lining the end of each article prior to forming the weld with material adapted to protect the inner surface of the article from contact by flashings thrown off during the formation of the weld, disposing in each article an element operative to support the lining material at a point remote from the outer end thereof, bringing said ends of the articles together and forming a weld therebetween, and finally removing from the welded articles said elements and the agglomerated mass of lining material and metallic flashings remaining therein after the completion of the weld.

11. In a method of making a butt welded joint between the ends of two tubular articles, the steps of forming in one end of each article preparatory to actually making the weld a cup-shaped clay plug of such diameter as to provide a lining around its entire inner end surface, then bringing the said ends of the articles together and forming a weld therebetween, and finally removing from the welded article the agglomerated mass of clay and metallic flashings remaining therein after the weld is completed.

WILLIAM C. CORYELL.